July 12, 1960     H. R. LEECH     2,944,949
PROCESS FOR THE ELECTROLYTIC SEPARATION
OF TITANIUM FROM TITANIUM SCRAP
Filed May 8, 1959
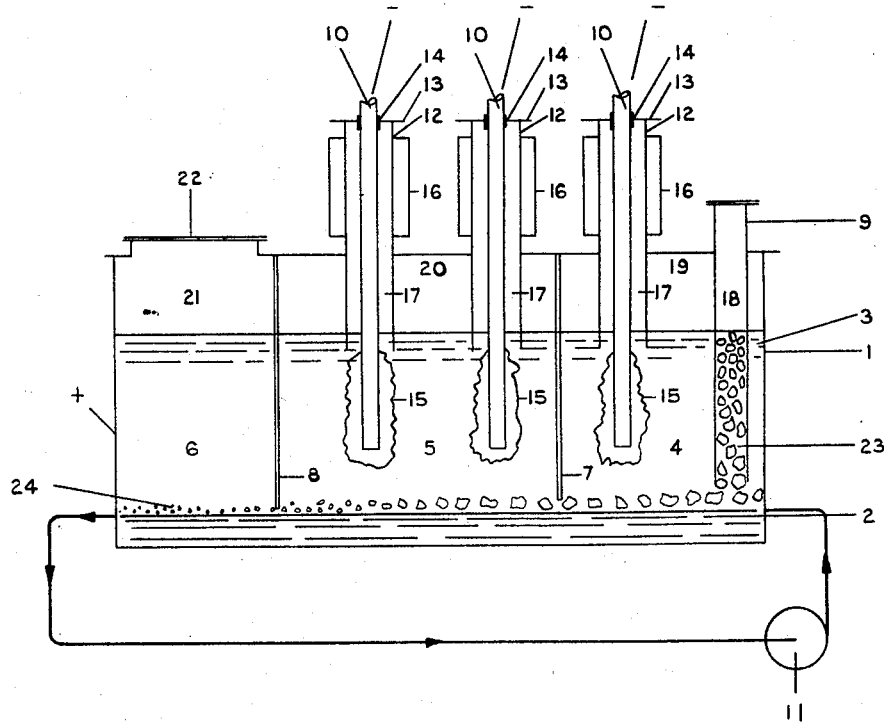
*INVENTOR:*
*Harry Rowland Leech,*
BY *Cushman, Darby & Cushman*
                                 *ATTORNEYS.*

2,944,949

PROCESS FOR THE ELECTROLYTIC SEPARATION OF TITANIUM FROM TITANIUM SCRAP

Harry Rowland Leech, Widnes, England, assignor to Imperial Chemical Industries Limited, London, England, a corporation of Great Britain Filed May 8, 1959, Ser. No. 811,852

Claims priority, application Great Britain May 9, 1958

15 Claims. (Cl. 204—64)

The present invention is concerned with a process for the electrolytic separation of titanium from titanium scrap and is particularly concerned with a process for the electrolytic separation of titanium from titanium scrap by electro-deposition of the titanium on a cathode in a fused salt.

By the term "titanium scrap" is meant titanium metal which is contaminated to such an extent as to reduce substantially its value in metallurgical fabrication. Said contamination is usually due for instance to oxygen and nitrogen.

In the recovery of titanium from scrap by electro-refining in a fused salt bath, wherein the titanium scrap is the anode, the titanium passes into solution and the contaminants remain behind in the anode sludge or anode slime.

The object of the present invention is to provide a process for the electrolytic separation of titanium from titanium scrap by electro-deposition of the titanium on a cathode in a fused salt under such conditions inter alia that air is excluded which permits anode sludges or slimes formed during said electro-deposition to be removed smoothly and economically.

According to the present invention the process for the electrolytic separation of titanium from titanium scrap by electro-deposition of the titanium on a cathode in a fused salt in an electrolytic cell comprises employing in the fused salt a metal which is molten at the temperature of the fused salt and which is not anodically attacked when in contact with titanium, is denser than titanium and is compatible with the material of construction of the cell, floating the titanium scrap on and keeping it in electrical contact with said metal in molten condition, dissolving the titanium from the titanium scrap into the fused salt by passing an electric current between said metal in molten condition and the cathode, and removing by said metal in molten condition matter which is undissolved in the fused salt and is derived from the titanium scrap during passage of the electric current.

Said metal may be, for example, tin or lead or other metal which is molten at the temperature of the electro-deposition or it may be in the form of an alloy which is molten at the temperature of the electro-deposition. Said alloy may be one which is molten, for example, at a temperature below 800° C., as for example a tin alloy having this characteristic. Whatever metal is used which is molten at the temperature of the electro-deposition the titanium scrap has to float on it, it has to carry the current to the titanium scrap, and has to remove the scrap or slime from the fused salt, that is to say out of the electrolytic cell. Some or all of the scrap or slime may dissolve in or alloy with the molten metal or may simply float upon the molten metal.

Said metal is preferably circulated through the electrolytic cell.

The fused salt is preferably a fused salt system wherein a titanium salt is an essential constituent. The titanium salt may be, for example, titanium dichloride which may be present from the equivalent of 5% of titanium to twice to three times this amount. A suitable fused salt system, for example, is one consisting of titanium dichloride and sodium chloride. Such a fused salt system may contain in addition potassium chloride and/or lithium chloride and/or strontium chloride. Fused salt systems comprising titanium dichloride and having a melting point below 800° C. are particularly useful Apparatus according to the invention comprises an electrolytic cell of the kind which permits electrolytic separation of titanium from titanium scrap by electro-deposition of the titanium on a cathode in a fused salt and comprising means to permit air to be excluded and an inert gas to be introduced, means to permit the salt to be kept in molten condition, means to permit the cathode with its deposit of titanium to be withdrawn into an inert gas and the fitting of a fresh cathode in the presence of an inert gas is characterized in that it has means for the introduction into the fused salt of a metal which is molten at the temperature of the fused salt and which is not anodically attacked when in contact with titanium, is denser than titanium and is compatible with the material of construction of the cell, in that it has means to introduce the titanium scrap and float it in electrical contact on said metal in molten condition and in that it has means which permit said metal in molten condition to be withdrawn after it has removed from the fused salt matter which is undissolved therein and which is derived from the titanium scrap during the passage of an electric current.

Preferably the electrolytic cell has means to keep said metal circulated through it.

An embodiment of apparatus according to the invention for the carrying out of the process of the invention is illustrated by way of example in the digrammatic drawing accompanying the provisional specification wherein 1 is a mild steel tank on the base of which is a layer of molten metal 2 upon which is a molten electrolyte 3. The tank 1 is divided into three compartments, 4, 5, 6 by mild steel partitions 7 and 8. Compartment 5 is the main compartment. Tank 1 is also provided with means (not shown) for adding raw material and fresh electrolyte into feed pipe 9, means (not shown) for introducing and removing the mild steel cathodes 10 and means (not shown) for removing residues from the end compartment 6. Means 11 are also provided for circulating the molten metal 2. The tank 1 rests in a furnace (not shown) by which it can be brought to operating temperature and kept at that temperature. The furnace may be heated for instance by electricity, oil or gas.

The cathodes 10 are housed in bells 12 which provide a seal below the surface of the electrolyte 3. The cathodes may be removed by unbolting lids 13 from the flanged end of the bells 12. Insulating material 14 prevents the cathodes 10 from being electrically connected with the lids 13 and the steel structure of the cell 1, and at the same time permits a sliding joint so that the cathodes 10 may be raised or lowered. Thus when a cathode 10 has received its complement of titanium deposit 15 it may be raised out of the electrolyte 3 into a higher position in the bell 12. Means 16 are provided for cooling the upper portion of the bells 12. Said means 16 may depend for example on circulating cooling water, or the provision of fins over which cooling air may circulate. A supply of inert gas, of which argon is the best example, is separately connected to each of the confined spaces 17, 18, 19, 20, 21 and the whole apparatus is maintained under a slight positive pressure of inert gas, to prevent ingress of air. 22 is a cover for compartment 6. 23 is titanium scrap and 24 is scrap and slime.

The steel tank 1, the molten metal 2 and the titanium scrap 23 form the anodic portion of the cell.

By way of example the process of the invention may be carried out as follows in the aforesaid embodiment of an electrolytic cell according to the invention.

Tank 1 is filled with electrolyte made, for example, as follows. The electrolyte is a fused salt containing some lower titanium chloride, of which about 10–15% is a convenient concentration. This electrolyte may be made by immersing titanium scrap in fused salt and passing in titanium tetrachloride vapour, which is reduced to titanium di- and tri-chlorides which dissolve in the fused salt. Whilst sodium chloride is a very suitable salt, any chloride which is not reduced by titanium may be used, that is, chlorides of alkali metals or alkaline earth metals. Bromides may be used in place of chlorides but on grounds of expense, such variations are to be avoided. The addition of about 5% of a fluoride, e.g. sodium fluoride, is advantageous in obtaining a cathodic desposit of high quality.

Tank 1 with its contents is brought to working temperature, which is measured at appropriately located thermometer points. The bottom of tank 1 is covered with the molten metal 2, and suitably comminuted titanium scrap 23 is fed in through the feed pipe 9. The molten metal is circulated so that the titanium scrap 23 is carried into and through the electrolytic cell, that is to say under the partition 7 into the main deposition compartment 5. Partition 8 is set close to the surface of the molten metal 2 so that only very small particles and slimes 24 can be carried underneath into compartment 6.

An electric current is now passed between the cathodes 10 and the anodic part of the electrolytic cell. Although the steel tank 1 and the molten metal 2 are anodic, it is found that only the titanium scrap passes into solution in the fused salt. If supplies of titanium are allowed to run short the molten metal 2 and the tank 1 will begin to be attacked, so that the electrolytic cell must be well supplied with titanium scrap 23 through the feed pipe 9. There must also be an adequate rate of circulation of the molten metal 2 so that small amounts of titanium are drawn into the end compartment 6, as determined by inspection through its top.

On first passing electric current through the electrolytic cell, the titanium trichloride present is reduced at the electrodes 10 to titanium dichloride. After this, there is a cleaning up action, that is to say there is removal of impurities such as iron, which is electrochemically more noble than titanium and therefore deposited on the cathodes 10 in preference to it, and of oxygen which may be present as oxides dissolved in the salt. Then there is a preliminary deposition of titanium upon the cathodes 10. These cathodes 10 upon which this preliminary deposition of titanium takes place are however removed as the deposits of titanium are of low quality. These cathodes 10 can be referred to as "conditioning" cathodes. After these "conditioning" cathodes are removed new cathodes 10 are introduced. Of these new cathodes only cathode 10 in the end compartment 4 is used as a "conditioning" cathode as the other new cathodes 10 are used as "production" cathodes. The amount of current taken by cathode 10 in compartment 4 is regulated, e.g. by an external resistance. Only enough current is passed through this cathode to ensure that the next cathode 10, i.e. the one nearest to it in compartment 5, is making titanium of the desired specification. The "production" cathodes 10 are supplied with an appropriate current, which may vary within wide limits according to production requirements. It is found that over a range of current densities between 4 and 40 amps./sq. in. (calculated on the immersed area of the initial cathode on which deposition starts) very good quality titanium metal is obtained.

After an appropriate time, determined by the total current passed and the diameter of the bells 12 the cathodes 10 are in turn taken out of the electrolyte 3, allowed to drain and cool, and then removed from the electrolytic cell by removing the covers 13. Other cathodes 10 are then inserted and the operations are begun again.

In this way a high quality titanium is recovered, whilst impurities such as oxide, carbide and nitride in the titanium scrap, and more noble alloying elements, e.g. iron, tin, remain behind as slimes or are dissolved in the molten metal 2. The slimes and residues 24 are carried into the end compartment 6. By removing the cover 22 of this compartment, these slimes or residues 24 may be scraped out. At the same time some of the electrolyte 3 and some of the molten metal 2 are also removed. The amount of slimes and residues 24 to be removed is such as to prevent an undue depth of slimes or residues 24 accumulating above the molten metal 2, and the amount of molten metal 2 to be removed is such as to maintain the alloy constituents of the titanium scrap 23 which dissolve in the molten metal 2 within predetermined limits. The material so removed may be subjected to normal chemical and metallurgical processes for recovery of any valuable constituents.

Because of the removal of material from the end compartment 6 and because of the "drag out" loss of electrolyte attached to the cathodic deposit of titanium 15, some make up is essential. This may conveniently be done in the feed pipe 9. The extra metal required for the molten metal 2 may be added, as solid or liquid. In the same way the extra salt required for the molten electrolyte 3 may be added as solid or liquid. Also, by passing some titanium tetrachloride vapour into this pipe 9, below the level of the titanium scrap 23 standing in it, an amount of lower titanium halides is produced, and by control of the titanium tetrachloride feed, the lower halides are proportioned to the salt feed to give the desired electrolyte composition. However, this is not the only method of adding make-up. For example molten metal 2 can be added to the end compartment 6 and make up electrolyte may be made in a separate vessel and added to the first compartment 4. This latter procedure may be necessary when grades of titanium scrap are processed which give rise to electrolyte contamination to such an extent that a considerable replacement rate is needed.

It is thus seen that the procedure preferably adopted is such that any impurities are removed at the "conditioning" electrode 10, that is to say electrode 10 in compartment 4, before the fully reduced and conditioned molten electrolyte 3 flows under partition 7 and enters the main compartment 5. In this way the quality of the cathodically deposited titanium can be maintained high and free from hardening impurities such as oxygen. The titanium 15 which is removed from cathodes 10 in compartment 5 is in large dendritic crystalline form. The titanium may be washed whilst attached to a cathode or may be scraped off before washing. Acid conditions and rapid agitation should however always preferably be maintained, because of the presence of titanium dichloride in the adherent electrolyte as titanium dichloride tends to form insoluble basic oxidic compounds which contaminate and harden the metal. A very satisfactory method of working is to agitate a cathode with its deposit of titanium in successive charges of 1% sulphuric acid until a sample of the acid is free from chloride ion. The titanium is then mechanically scraped from the cathode, is given a further wash in pure water to remove all sulphuric acid, and is then dried at a temperature not exceeding 60° C. In this way metal of less than 100 D.P.N. (Diamond Pyramid Number) hardness can be assured.

What I claim is:

1. A process for the electrolytic separation of titanium from titanium scrap by electro-deposition of the titanium on a cathode in a fused salt in an electrolytic cell which comprises employing in the fused salt a metal which is molten at the temperature of the fused salt and which is not anodically attacked when in contact with titanium, is denser than titanium and is compatible with the material of construction of the cell, floating the titanium scrap on and keeping it in electrical contact with said metal in molten condition, dissolving the titanium from the titanium scrap into the fused salt by passing an electric current between said metal in molten condition and the cathode, and removing by said metal in molten condition matter which is undissolved in the fused salt and is derived from the titanium scrap during passage of the electric current.

2. A process as claimed in claim 1 wherein said metal is tin.

3. A process as claimed in claim 1 wherein said metal is lead.

4. A process as claimed in claim 1 wherein said metal is in the form of an alloy which is molten at the temperature of the electrodeposition.

5. A process as claimed in claim 4 wherein said alloy is molten at a temperature below 800° C.

6. A process as claimed in claim 5 wherein said alloy is a tin alloy.

7. A process as claimed in claim 1 wherein said metal is circulated through the electrolytic cell.

8. A process as claimed in claim 1 wherein the fused salt is a fused salt system wherein a titanium salt is an essential constituent.

9. A process as claimed in claim 8 wherein the titanium salt is titanium dichloride.

10. A process as claimed in claim 9 wherein the titanium dichloride is present from the equivalent of 5% of titanium to three times this amount.

11. A process as claimed in claim 8 wherein the fused salt system is one consisting of titanium dichloride and sodium chloride.

12. A process as claimed in claim 8 wherein the fused salt system contains in addition potassium chloride.

13. A process as claimed in claim 8 wherein the fused salt system contains in addition lithium chloride.

14. A process as claimed in claim 8 wherein the fused salt system contains in addition strontium chloride.

15. A process as claimed in claim 8 wherein the fused salt system has a melting point below 800° C.

References Cited in the file of this patent

UNITED STATES PATENTS

| | | |
|---|---|---|
| 2,544,138 | De Nora | Mar. 6, 1951 |
| 2,757,135 | Gleave et al. | July 31, 1956 |
| 2,917,440 | Olson | Dec. 15, 1959 |

FOREIGN PATENTS

| | | |
|---|---|---|
| 745,530 | Great Britain | Feb. 29, 1956 |
| 500,594 | Canada | Mar. 16, 1954 |